No. 879,089. PATENTED FEB. 11, 1908.
C. A. DESPAIN, G. A. KITT & E. R. GORDON.
WEED CUTTER.
APPLICATION FILED MAY 28, 1907.

2 SHEETS—SHEET 2.

WITNESSES

INVENTORS
Charles A. Despain
George A. Kitt
Edsil R. Gordon
BY
ATTORNEYS

UNITED STATES PATENT OFFICE.

CHARLES A. DESPAIN, GEORGE A. KITT, AND EDSIL R. GORDON, OF HARRINGTON, WASHINGTON.

WEED-CUTTER.

No. 879,089.　　　　　Specification of Letters Patent.　　　　　Patented Feb. 11, 1908.

Application filed May 28, 1907. Serial No. 376,089.

*To all whom it may concern:*

Be it known that we, CHARLES A. DESPAIN, GEORGE A. KITT, and EDSIL R. GORDON, citizens of the United States, and residents of Harrington, in the county of Lincoln and State of Washington, have invented a new and Improved Weed-Cutter, of which the following is a full, clear, and exact description.

This invention relates to agricultural implements, and especially to weed cutters.

The object of the invention is to produce an implement of this class of simple construction, which will operate efficiently to cut away or remove weeds, roots and similar obstructions near the ground level.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1:
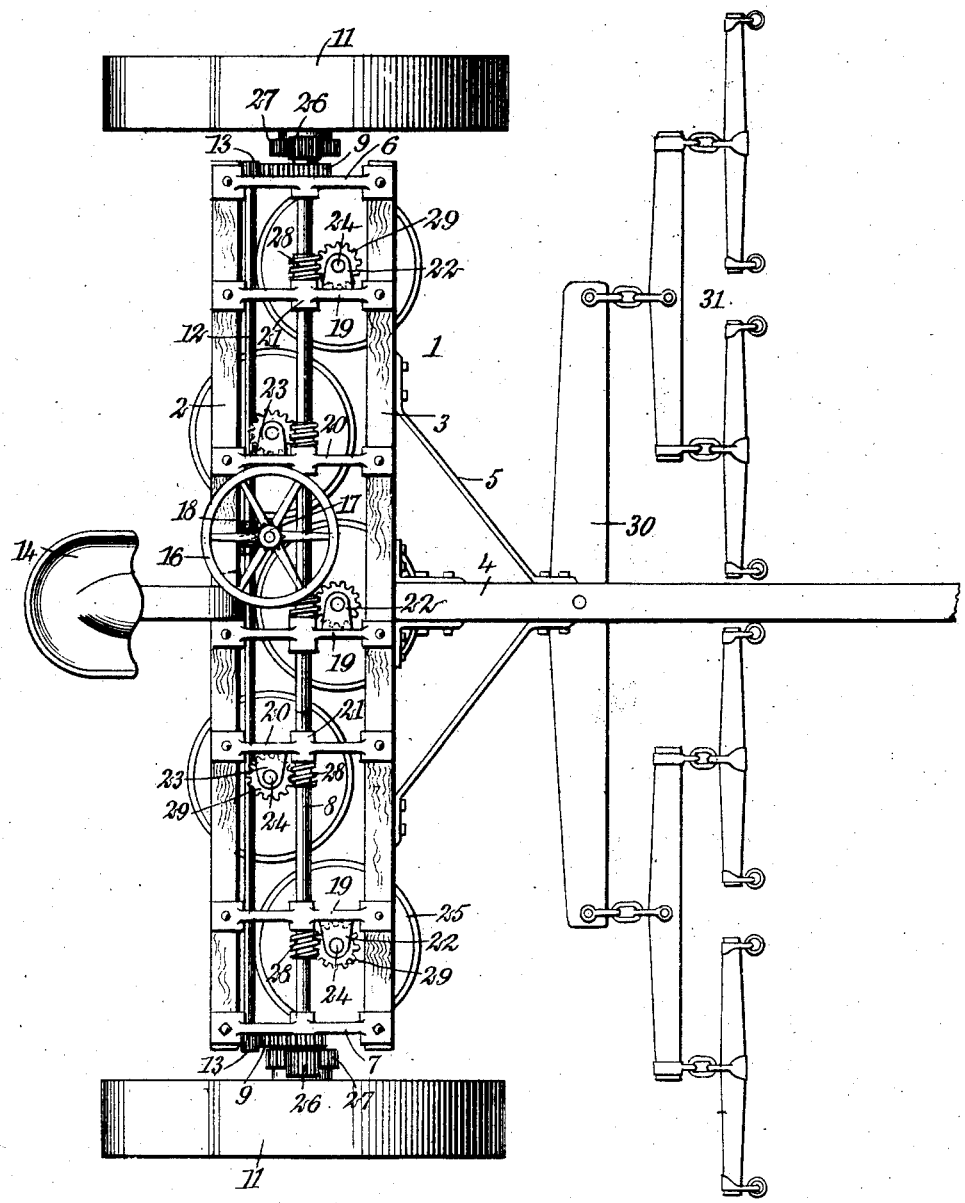
Figure 2:
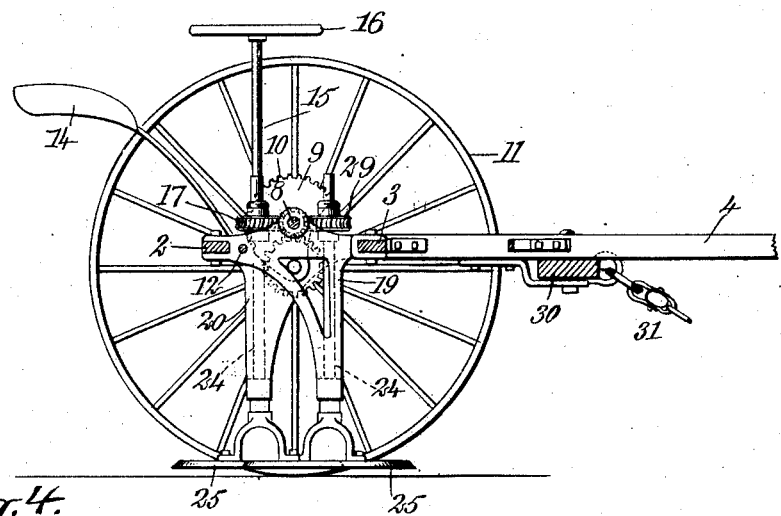
Figure 4:
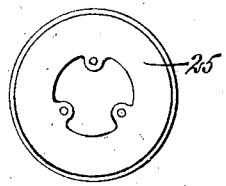
Figure 3:
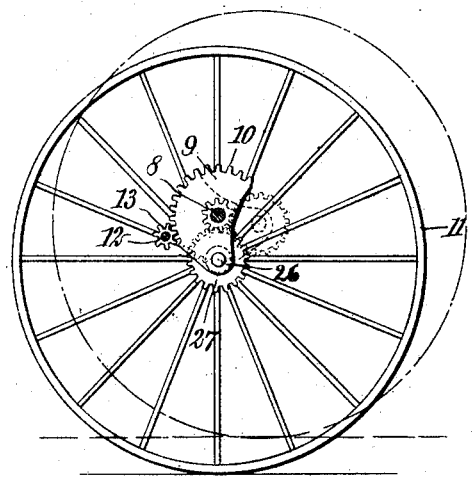

Figure 1 is a plan of the machine; Fig. 2 is a vertical section taken in a plane parallel with the tongue of the implement; Fig. 3 is a side elevation illustrating the manner in which the machine is adjusted; and Fig. 4 is a plan of one of the cutters.

Referring more particularly to the parts, 1 represents the frame of the machine, which comprises two parallel beams 2 and 3, the forward beam 3 being rigidly attached to a tongue or pole 4. Diagonal braces 5 are used for connecting the pole to the beams, as indicated, so that a rigid structure results. Connecting the beams 2 and 3, I provide axle brackets 6 and 7. These brackets are formed with bearings for the axle 8 of the machine, which extends horizontally through the frame between the beams. To the ends of this axle 8, which projects beyond the brackets 6 and 7, segments 9 are attached. These segments have the form shown in Fig. 3; they present circumferentially disposed teeth 10; they are of substantially semi-circular form and they have downwardly projecting ears, respectively, upon which the wheels 11 are rotatably mounted. Just forward of the rear beam 2 there is provided an adjusting shaft 12 which carries pinions 13 on its ends meshing with the segments 9 aforesaid. Near the driver's seat 14 an adjusting spindle 15 is provided, having a suitable hand-wheel 16 and provided adjacent to the shaft 12 with a worm 17. This worm meshes with a worm-wheel 18 carried by the shaft 12, as indicated in Fig. 1. This construction enables the wheels to be adjusted to a higher or lower position with respect to the frame, as indicated in the dotted lines in Fig. 3.

Throughout their length, the beams 2 and 3 are connected by intermediate brackets 19 and 20. These brackets all have alining bearings 21 through which the aforesaid axle 8 passes as shown. The brackets 19 and 20 are alike, except that they are "rights and lefts" respectively. The brackets 19 are formed with housings 22 which are offset from the body of the bracket laterally, and on the side, forward of the axle 8. The brackets 20 are similarly provided with offset housings 23, but these are disposed to the rear of the axle. In the housings 22 and 23, spindles 24 are rotatably mounted and to the lower ends of these spindles, circular knives or cutters 25 are attached. On account of the arrangement described for the housings, these cutters are in a "staggered" relation. The cutters are of sufficiently large diameter so that the side edges of adjacent cutters project beyond each other. In this way the cutters cover, as the machine advances, a continuous strip or swath equal to the width of the machine.

In order to rotate the cutters continuously as the machine advances, the ends of the axle 8 are provided with pinions 26 which mesh with gear-wheels 27 carried by the hubs of the wheels, and in this way, the wheels drive the axle. The axle is provided with worms 28 opposite the spindles 24 which mesh with worm-wheels 29 carried by the spindles. Thus the spindles are continuously driven. It will be seen that alternate spindles with their cutters, will rotate in opposite directions. It will be observed also that on account of the opposite character of the brackets 19 and 20, the bracket 19 on one side of the tongue of the machine may be also used as a bracket 20, if applied on the opposite side of the machine. That is, the brackets are reversible from one side of the machine to the other.

To the pole or tongue 4, an equalizer bar 30 is attached, with doubletrees 31 connected thereto for attaching draft animals to draw the machine along.

By means of the hand-wheel 16, the frame of the machine may be raised or lowered upon the wheels so as to bring the cutters to the desired level in cutting the weeds. In driving to or from the field, the cutters will, of course, be raised so that they do not operate.

Having thus described our invention, we claim as new and desire to secure by Letters Patent:

1. In an implement of the class described, in combination, a frame, an axle rotatably mounted therein, segments rigidly attached at their centers to said axle, an adjusting shaft, means for rotating the same, pinions carried by said shaft meshing with said segments, wheels attached to said segments to be raised or lowered with respect to said frame when said segments are adjusted, gear-wheels carried respectively by said wheels, pinions carried by said axle, and driven by said last gear-wheels, a plurality of cutters carried near the ground level, and means for driving said cutters from said axle.

2. In an implement of the class described, in combination, a frame having a pair of transversely disposed beams brackets connecting the same, an axle rotatably mounted in said brackets, cutters carried by said brackets arranged alternately on opposite sides thereof, means for driving said cutters alternately in opposite directions, said cutters being disposed with their adjacent edges projecting beyond each other, wheels, means for driving said wheels, and means for raising and lowering said frame on said wheels.

In testimony whereof we have signed our names to this specification in the presence of two subscribing witnesses.

CHAS. A. DESPAIN.
GEORGE A. KITT.
EDSIL R. GORDON.

Witnesses:
W. A. CLINE,
D. S. WOLFE.